US006245832B1

(12) United States Patent
Suzuki et al.

(10) Patent No.: US 6,245,832 B1
(45) Date of Patent: Jun. 12, 2001

(54) INK FOR INK JET RECORDING

(75) Inventors: Atsushi Suzuki; Toshitake Yui; Nobuyuki Ichizawa; Kunichi Yamashita; Takatsugu Doi; Ken Hashimoto, all of Kanagawa (JP)

(73) Assignee: Fuji Xerox Co., Ltd, Tokyo (JP)

( * ) Notice: Subject to any disclaimer, the term of this patent is extended or adjusted under 35 U.S.C. 154(b) by 0 days.

(21) Appl. No.: 09/251,481

(22) Filed: Feb. 17, 1999

(30) Foreign Application Priority Data

Feb. 18, 1998 (JP) .................................................. 10-052881

(51) Int. Cl.$^7$ ............................ C09D 11/10; C08L 25/04; C08L 33/02
(52) U.S. Cl. ............................ 523/160; 524/548; 524/556
(58) Field of Search ..................................... 523/160, 161; 106/31.6, 31.65; 524/505, 556, 548

(56) References Cited

U.S. PATENT DOCUMENTS

| | | | |
|---|---|---|---|
| 4,597,794 | * | 7/1986 | Ohta et al. ............................ 347/100 |
| 5,085,698 | | 2/1992 | Ma et al. . |
| 5,141,556 | * | 8/1992 | Matrick .............................. 106/31.58 |
| 5,401,303 | * | 3/1995 | Stoffel et al. ...................... 106/31.43 |
| 5,431,720 | * | 7/1995 | Nagai et al. ....................... 106/31.43 |
| 5,439,514 | * | 8/1995 | Kashiwazaki et al. ........... 106/31.65 |
| 5,658,376 | * | 8/1997 | Noguchi et al. ................... 106/31.43 |
| 5,686,508 | * | 11/1997 | Shimomura et al. ................ 523/161 |
| 5,879,439 | * | 3/1999 | Nagai et al. ....................... 106/31.28 |
| 5,919,294 | * | 7/1999 | Hirasa et al. ........................ 106/31.9 |
| 5,985,975 | * | 11/1999 | Kurabayashi et al. ............... 524/462 |
| 6,011,098 | * | 1/2000 | Kashiwazaki et al. .............. 524/377 |
| 6,114,411 | * | 9/2000 | Nakamura et al. ................... 523/161 |

FOREIGN PATENT DOCUMENTS

| | | |
|---|---|---|
| 56-147859 | 11/1981 | (JP) . |
| 3-210373 | 9/1991 | (JP) . |
| 4-18461 | 1/1992 | (JP) . |
| 6-100810 | 4/1994 | (JP) . |

* cited by examiner

Primary Examiner—Vasu Jagannathan
Assistant Examiner—Callie E. Shosho
(74) Attorney, Agent, or Firm—Finnegan, Henderson, Farabow, Garrett & Dunner, L.L.P.

(57) ABSTRACT

Disclosed is an ink for ink jet recording comprising water, a water-soluble organic solvent, a pigment and a dispersant, wherein the dispersant has a hydrophilic moiety and a hydrophobic moiety and comprises a copolymer obtained by copolymerizing from 40 to 80 mol % of a monomer having an α,β-ethylenically unsaturated group constituting the hydrophilic moiety and from 20 to 60 mol % of a monomer having an α,β-ethylenically unsaturated group constituting the hydrophobic moiety.

10 Claims, No Drawings

INK FOR INK JET RECORDING

FIELD OF THE INVENTION

The present invention relates to an ink for ink jet recording which can be used in the ink jet recording system, a process for producing the ink and an ink jet recording method using the ink.

BACKGROUND OF THE INVENTION

The principle of ink jet recording system is to eject a liquid or fused solid ink from nozzle, slit, porous film or the like to make recording on a recording material such as paper, cloth or film. For ejecting an ink, various methods have been proposed, such as a method of ejecting an ink using an electrostatic induction, namely, so-called charge control system; a method of ejecting an ink using a piezoelectric element and an oscillation pressure; and a method of ejecting an ink using a pressure generated as a result of forming and growing bubbles by heat, so-called thermal ink jet system. Using these methods, a high precision image can be obtained.

The ink for ink jet recording is required to have the following properties:

(1) that a high-resolution and high-density uniform image can be obtained without causing blotting or fogging on paper;

(2) that clogging due to drying of the ink does not occur at a nozzle tip and ejection responsibility and ejection stability are always kept in good condition;

(3) that the ink on paper exhibits good drying property;

(4) that the image has good fastness; and (5) that high stability is ensured in the long-term storage.

As the ink for ink jet recording, an ink comprising a dye as a coloring material is predominantly used. However, the dye is disadvantageous in that the image is inferior in the water resistance and light fastness. To cope with this, development of an ink using a pigment as a coloring material is proceeding. Since the pigment is substantially insoluble in water, studies are being made on the method using a dispersant for stably dispersing the pigment in ink. However, if a surfactant is used as the dispersant, the surface tension excessively decreases and troubles are readily caused, such as deterioration in the quality of the printed image and printing drop out due to bubbles. Accordingly, use of a dispersant comprising a polymer compound is being studied.

As the polymer dispersant, various copolymers having both a hydrophobic moiety highly affinitive for a pigment and a hydrophilic moiety highly affinitive for an aqueous medium have been proposed. For example, an ink containing a polymer dispersant and a specific solvent (JP-A-56-147859 (the term "JP-A" as used herein means an "unexamined published Japanese patent application")), an ink containing acidic carbon black and a water-soluble resin having a specific molecular weight in a specific content ratio (JP-A-3-210373) and an ink containing acidic carbon black and a water-soluble resin having a specific acid value (JP-A-4-18461) are disclosed.

With respect to the form of the copolymer for the polymer dispersant, inks using a random copolymer (JP-A-56-147859), a block copolymer (U.S. Pat. No. 5,085,698) or a graft copolymer (JP-A-6-100810) are disclosed. Block copolymers and graft copolymers controlled in the orientation of monomers are considered to have an ideal structure as the dispersant, however, these are disadvantageously complicated in the synthesis process and in turn expensive. Conventional random copolymers are relatively easy to produce, however, properties of this polymer such as the kind of monomer selected, molecular weight and acid value, have not yet been thoroughly studied and copolymers satisfying all of the above-described properties required have not yet obtained.

SUMMARY OF THE INVENTION

Accordingly, the object of the present invention is to solve the problems in related techniques and provide an ink for ink jet recording, capable of forming a high-resolution, high-density uniform image on a paper without undergoing blotting or fogging, prevented from generation of clogging at the nozzle tip due to drying of the ink, always exhibiting good ejection responsibility and good ejection stability, assuring good fastness of the image and having good long-term storage stability.

As a result of extensive investigations on the polymer dispersant, the present inventors have found that the above-described object can be attained by an ink for ink jet recording comprising water, a water-soluble organic solvent, a pigment and a dispersant, wherein the dispersant consists of a hydrophilic moiety and a hydrophobic moiety and comprises a copolymer obtained by copolymerizing from 40 to 80 mol % of a monomer having an $\alpha,\beta$-ethylenically unsaturated group constituting the hydrophilic moiety and from 20 to 60 mol % of a monomer having an $\alpha,\beta$-ethylenically unsaturated group constituting the hydrophobic moiety and assuming that the weight average molecular weight is Mw and the number average molecular weight is Mn, the copolymer has a specific Mw/Mn. That is, an ink for ink jet recording in which the change in viscosity of the ink after storage at 60° C. for 100 hours is 0.3 mPa·s or less at a shear rate of 1,400 s$^{-1}$ can be provided. The present invention has been accomplished based on this finding.

More specifically, the present invention provides:

an ink for ink jet recording comprising water, a water-soluble organic solvent, a pigment and a dispersant, wherein the change in viscosity of the ink after storage at 60° C. for 100 hours is 0.3 mPa·s or less at a shear rate of 1400 s$^{-1}$;

an ink for ink jet recording comprising water, a water-soluble organic solvent, a pigment and a dispersant, wherein the dispersant has a hydrophilic moiety and a hydrophobic moiety and comprises a copolymer obtained by copolymerizing from 40 to 80 mol % of a monomer having an $\alpha,\beta$-ethylenically unsaturated group constituting the hydrophilic moiety and from 20 to 60 mol % of a monomer having an $\alpha,\beta$-ethylenically unsaturated group constituting the hydrophobic moiety, the copolymer has a weight average molecular weight Mw of from 3,000 to 15,000 and assuming that the number average molecular weight is Mn, the Mw/Mn is from 1 to 2.5;

a process for producing an ink for ink jet recording, comprising previously mixing a pigment with the above-described dispersant, dispersing the pigment in water and then mixing the dispersion solution with water and a water-soluble organic solvent; and an ink jet recording method comprising ejecting the above-described ink for ink jet recording from an orifice according to a recording signal to effect recording on a recording material.

DETAILED DESCRIPTION OF THE INVENTION

The present invention is described in detail below.

The ink for ink jet recording of the present invention comprises water, a water-soluble organic solvent, a pigment and a dispersant. The dispersant has a hydrophilic moiety and a hydrophobic moiety and comprises a copolymer obtained by copolymerizing a monomer having an α,β-ethylenically unsaturated group constituting the hydrophilic moiety and a monomer having an α,β-ethylenically unsaturated group constituting the hydrophobic moiety.

The constitutional ratio of the monomer having an α,β-ethylenically unsaturated group constituting the hydrophilic moiety is from 40 to 80 mol %, preferably from 50 to 80 mol %, more preferably from 60 to 80 mol %. The constitutional ratio of the monomer having an α,β-ethylenically unsaturated group constituting the hydrophobic moiety is from 20 to 60 mol %, preferably from 20 to 50 mol %, more preferably from 20 to 40 mol %. If the constitutional ratio of each monomer in the copolymer departs from this range and the hydrophobic moiety occupies the major part, the solubility in an aqueous medium decreases and the stability is deteriorated, whereas if the hydrophilic moiety occupies the major part, the water solubility becomes excessively high and the water resistance is deteriorated or the image density decreases.

The monomer having an α,β-ethylenically unsaturated group constituting the hydrophilic moiety is not particularly limited, however, monomers having a carboxyl group, a sulfonic acid group, a hydroxyl group or a polyoxyethylene group may be preferably used. Examples thereof include acrylic acid, methacrylic acid, crotonic acid, itaconic acid, itaconic acid monoester, maleic acid, maleic acid monoester, fumaric acid, fumaric acid monoester, vinylsulfonic acid, styrenesulfonic acid and sulfonated vinylnaphthalene. Of these, carboxyl group-containing monomers such as acrylic acid, methacrylic acid, maleic acid (anhydride), maleic acid monoester, crotonic acid, itaconic acid, itaconic acid monoester, fumaric acid and fumaric acid monoester are preferred, and an acrylic acid, a methacrylic acid and a maleic acid (anhydride) are more preferred. These monomers may be used either individually or in combination of two or more thereof.

The monomer having an α,β-ethylenically unsaturated group constituting the hydrophobic moiety is not particularly limited, however, styrene, styrene derivatives such as α-methylstyrene and vinyl tolueine, vinylnaphthalene, vinylnaphthalene derivatives, acrylic acid alkyl esters, methacrylic acid alkyl esters, crotonic acid alkyl esters, itaconic acid dialkyl esters and maleic acid dialkyl esters are preferably used. Of these, styrene and alkyl, aryl or alkylaryl ester of (meth)acrylic acid are preferred. These monomers may be used either individually or in combination of two or more thereof.

The polymerization initiator for use in the copolymerization of these monomers is not particularly limited and either a known polymerization initiator or a newly synthesized polymerization initiator may be used, however, an ink excellent as an ink for ink jet recording may be obtained by random copolymerizing the monomers using a polymerization initiator having a hydrophilic functional group.

The hydrophilic functional group of the polymerization initiator is preferably a carboxyl group, a hydroxyl group, a sulfonic acid group or a sulfuric acid group, more preferably a carboxyl group. Examples of the polymerization initiator include azo-type initiators such as azobisisobutyronitrile, azobis-2,4-dimethylvaleronitrile, azobiscyclohexanecarbonitrile, methyl azobisisobutyrate, azobisisobutylamidine hydrochloride, 4,4'-azobis-4-cyanopentanol and 4,4'-azobis-4-cyanovaleric acid, and peroxide-type initiators such as benzoyJ peroxide, di-t-butyl peroxide, potassium persulfate and ammonium persulfate.

Of these, 4,4'-azobis-4-cyanovaleric acid, potassium persulfate and ammonium persulfate are preferred. By performing random copolymerization, a dispersant suitable for the ink for ink jet recording can be obtained, the copolymerization is less restricted as compared with the case of performing block copolymerization or graft copolymerization, and many kinds of monomers can be selected. Also, the random copolymerization is industrially advantageous.

For determining the average molecular weight of a copolymer, various methods are known, however, the average molecular weight used in the present invention is defined as a value determined by the GPC (gel permeation chromatography) method. The copolymer for use in the ink for ink jet recording of the present invention has a weight average molecular weight of from 3,000 to 15,000, preferably from 4,000 to 10,000, more preferably from 4,000 to 7,000. If the weight average molecular weight of the copolymer is less than 3,000, the dispersion stability is deteriorated due to the excessively low molecular weight, whereas if it exceeds 15,000, the viscosity of the ink becomes high and the ejection property of the ink turns worse.

The ratio Mw/Mn of the weight average molecular weight Mw to the number average molecular weight. Mn of the copolymer used in the ink for ink jet recording of the present invention is from 1 to 2.5, preferably from 1 to 2.2. If the Mw/Mn exceeds 2.5, the viscosity increases or the dispersion becomes unstable. The molecular weight of the copolymer may be adjusted by controlling known polymerization conditions such as polymerization solvent selected, polymerization temperature or concentration of monomer or initiator or by using a chain transfer agent or the like in combination.

The copolymer used in the ink for ink jet recording of the present invention has an acid value of from 200 to 500 mgKOH/g, preferably from 250 to 450 mgKOH/g, more preferably from 300 to 400 mgKOH/g. If the acid value of the copolymer is less than 200 mgKOH/g, the solubility in an aqueous medium tends to decrease and the stability tends to be deteriorated, whereas if the acid value exceeds 500 mgKOH/g, the water solubility tends to become too high and poor water resistance or low image density may result.

In the dispersant used in the ink for ink jet recording of the present invention, the above-described copolymer is preferably neutralized at least in a degree of 50% to the acid value thereof. The neutralization may be attained using various basic substances, however, it is preferred to neutralize the copolymer by a basic substance containing at least one alkali metal hydroxide. As the alkali metal hydroxide, NaOH, KOH or LiOH may be used but NaOH is preferably used.

Preferred examples of the copolymer which can be used in the dispersant of the present invention are shown in Table 1 below.

TABLE 1

| No. | Kind of Monomer (charged, molar ratio) | Initiator | Weight Average Molecular Weight (Mw) | Mw/Mn | Acid Value (mgKOH/g) |
|---|---|---|---|---|---|
| 1 | styrene (33)/ methacrylic acid (67) | A | 6200 | 2.1 | 385 |
| 2 | styrene (20)/ methacrylic acid (80) | A | 6000 | 2.0 | 482 |
| 3 | styrene (50)/ methacrylic acid (50) | A | 7500 | 2.4 | 296 |

TABLE 1-continued

| No. | Kind of Monomer (charged, molar ratio) | Initiator | Weight Average Molecular Weight (Mw) | Mw/Mn | Acid Value (mgKOH/g) |
|---|---|---|---|---|---|
| 4 | styrene (33)/methacrylic acid (67) | B | 12000 | 2.0 | 390 |
| 5 | styrene (33)/methacrylic acid (67) | C | 3500 | 2.2 | 381 |
| 6 | styrene (33)/acrylic acid (67) | A | 6100 | 2.0 | 450 |
| 7 | styrene (60)/maleic anhydride (40) | B | 4500 | 1.8 | 415 |
| 8 | n-butyl methacrylate (50)/methacrylic acid (50) | A | 8200 | 1.5 | 241 |
| 9 | styrene (20)/n-butyl methacrylate (30)/methacrylic acid (50) | A | 10100 | 1.8 | 270 |
| 10 | benzyl methacrylate (30)/methacrylic acid (70) | A | 4100 | 2.0 | 400 |

Initiator A: 4,4'-azobis-4-cyanovaleric acid
Initiator B: potassium persulfate
Initiator C: azobis-2,4-dimethylvaleronitrile The dispersant is preferably contained in the ink for jet recording in an amount of from 0.05 to 10 wt %, ferably from 0.1 to 5 wt %, based on the entire weight of ink. If the dispersant content is less than 0.05 wt %, unstable dispersion is liable to result, whereas if it exceeds 10 wt %, the viscosity of the ink readily increases and the ejection property or image quality may be deteriorated.

The pigment used in the ink for ink jet recording of the present invention may be either an inorganic pigment or an organic pigment.

The black pigment is preferably a carbon black pigment such as furnace black, lamp black, acetylene black and channel black. Examples of the carbon black pigment which can be used include Raven 7000, Raven 5750, Raven 5250, Raven 5000 ULTRA II, Raven 3500, Raven 2500 ULTRA, Raven 2000, Raven 1500, Raven 1255, Raven 1250, Raven 1200, Raven 1190 ULTRA II, Raven 1170, Raven 1080 ULTRA, Raven 1060 ULTRA, Raven 790 ULTRA, Raven 780 ULTRA, Raven 760 ULTRA (all produced by Colombian Carbon), Regal 400R, Regal 330R, Regal 660R, Mogul L, Monarch 700, Monarch 800, Monarch 880, Monarch 900, Monarch 1000, Monarch 1100, Monarch 1300, Monarch 1400 (all produced by Cabot), Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (all produced by Degussa), No. 25, No. 33, No. 40, No. 47, No. 52, No. 900, No. 2300, MCF-88, MA600, MA7, MA8 and MA100 (all produced by Mitsubishi Chemical Co. Ltd.).

Of these carbon blacks, preferred are those having a primary particle size of from 10 to 30 nm, more preferably from 15 to 30 nm. If the primary particle size is less than 10 nm, the viscosity of the ink increases and the ink is liable to have poor ejection property, whereas if it exceeds 30 nm, insufficient image density tends to result. The carbon black preferably has a BET specific surface area of from 80 to 200 $m^2/g$, more preferably from 80 to 150 $m^2/g$. If the BET specific surface area is less than 80 $m^2/g$, the amount of the dispersant polymer adsorbed tends to be reduced and the stability tends to be deteriorated, whereas if it exceeds 200 $m^2/g$, the viscosity of the ink tends to increase and the ejection property of the ink tends to turn to worse. The carbon black preferably has a volatile matter of from 1 to 6%, more preferably from 1.5 to 6%. If the volatile matter is less than 1%, the wettability of carbon black to water tend to be worse and the dispersibility tend to become poor, whereas if the volatile matter exceeds 6%, the dispersant polymer is difficultly adsorbed by the effect of repulsion between the acidic functional group on the surface of carbon black and the dispersant and in turn the stability tends to be deteriorated. Furthermore, the carbon black preferably has a DBP oil absorption of from 50 to 80 ml/100 g, more preferably from 50 to 70 ml/100 g. If the DBP oil absorption is less than 50 ml/100 g, the dispersibility tends to be deteriorated, whereas if it exceeds 80 ml/100 g, the viscosity of the ink tends to increase and the ejection property of the ink tends to turn to worse.

In the ink for ink jet recording of the present invention, a magnetic fine particle such as magnetite or ferrite, titanium black or the like may also be used as the black pigment.

The cyan pigment is not particularly limited but examples thereof include C.I. Pigment Blue-1, C.I. Pigment Blue-2, C.I. Pigment Blue-3, C.I. Pigment Blue-15, C.I. Pigment Blue-15:1, C.I. Pigment Blue-15:3, C.I. Pigment Blue-15:34, C.I. Pigment Blue-16, C.I. Pigment Blue-22 and C.I. Pigment Blue-60.

The magenta pigment is not particularly limited but examples thereof include C.I. Pigment Red 5, C.I. Pigment Red 7, C.I. Pigment Red 12, C.I. Pigment Red 48, C.I. Pigment Red 48:1, C.I. Pigment Red 57, C.I. Pigment Red 112, C.I. Pigment Red 122, C.I. Pigment Red 123, C.I. Pigment Red 146, C.I. Pigment Red 168, C.I. Pigment Red 184 and C.I. Pigment Red 202.

The yellow pigment is not particularly limited but examples thereof include C.I. Pigment Yellow-1, C.I. Pigment Yellow-2, C.I. Pigment Yellow-3, C.I. Pigment Yellow-12, C.I. Pigment Yellow-13, C.I. Pigment Yellow-14, C.I. Pigment Yellow-16, C.I. Pigment Yellow-17, C.I. Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-151 and C.I. Pigment Yellow-154.

In addition to the black pigment and cyan, magenta and yellow three primary color pigments, a specific color pigment such as red, green, blue, brown or white, a metal gloss pigment such as gold or silver, a colorless extender pigment, a plastic pigment and the like may be used. Furthermore, the pigment is not limited only to these pigments but newly synthesized pigments may also be used.

The pigment is preferably contained in the ink for ink jet recording of the present invention in an amount of from 0.5 to 10 wt %, more preferably from 0.5 to 8 wt %, based on the entire weight of the ink. If the pigment content is less than 0.5 wt %, the printed image is liable to have a low optical density, whereas if it exceeds 10 wt %, the viscosity of the ink tends to increase or the dispersion stability or ink ejection property may be reduced in some cases.

The water-soluble organic solvent used in the ink for ink jet recording of the present invention is not particularly limited, however, examples thereof include polyhydric alcohols such as ethylene glycol, diethylene glycol, propylene glycol, butylene glycol, triethylene glycol, 1,5-pentanediol, 1,2,6-hexanetriol, trimethylol-propane and glycerin; polyhydric alcohol derivatives such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether and dipropylene glycol monobutyl ether; sulfur-containing solvents such as pyrrolidone, N-methyl-2-pyrrolidone, cyclohexylpyrrolidone and triethanolamine; sulfur-containing solvents such as thiodiethanol, thiodiglycerol, sulforane and dimethylsulfoxide; and saccharides and saccharide alcohols such as propylene carbonate, ethylene carbonate, glucose and derivatives thereof.

These water-soluble organic solvents may be used either individually or in combination of two or more thereof. The content of the water-soluble organic solvent is preferably from about 1 to 60 wt %, more preferably from about 5 to 40 wt %, based on the entire weight of the ink for ink jet recording of the present invention. If the content is less than 1 wt %, the nozzle is readily clogged, whereas if it exceeds 60 wt %, troubles are liable to occur, for example, the drying property of the ink decreases or the image is deteriorated.

The water used in the ink for ink jet recording of the present invention is preferably ion exchanged water, ultrapure water, distilled water or ultrafiltered water, so that mixing of impurities can be prevented. The water is preferably contained in an amount of from 25 to 95 wt % based on the entire weight of the ink for ink jet recording of the present invention. If the content is less than 25 wt %, the ejection property is deteriorated in some cases, whereas if it exceeds 95 wt %, troubles such as clogging of the nozzle tend to occur.

The ink for ink jet recording of the present invention may contain a surfactant so as to control the ink properties such as surface tension. The amount of the surfactant added is preferably from 0.001 to 1 wt %, more preferably from 0.001 to 0.5 wt %, still more preferably from 0.01 to 0.2 wt %, based on the entire weight of the ink. If the amount of surfactant added is less than 0.001 wt %, the addition cannot yield any effect, whereas if it exceeds 1 wt %, troubles tend to occur, for example, the image is blurred.

The surfactant which can be added to the ink for ink jet recording of the present invention is not particularly limited and various anionic surfactants, nonionic surfactants, cationic e surfactants and amphoteric surfactants may be used. Particularly, an anionic surfactant or a nonionic surfactant is preferably used.

The anionic surfactant is not particularly limited but examples thereof include alkylbenzenesulfonate, alkylphenylsulfonate, alkylnaphthalenesulfonate, higher fatty acid salt, sulfate of higher fatty acid ester, sulfonate of higher fatty acid ester, sulfate or sulfonate of higher alcohol ether, higher alkyl sulfosuccinate, polyoxyethylene alkyl ether carboxylate, polyoxyethylene alkyl ether sulfate, alkylphosphate and polyoxyethylene alkyl ether phosphate. Of these, dodecylbenzenesulfonate, kerylbenzenesulfonate, isopropylnaphthalenesulfonate, monobutylphenylphenol monosulfonate, monobutylbiphenyl sulfonate, monobutylbiphenyl sulfonate and dibutylphenyl phenol disulfonate are preferred.

The nonionic surfactant is not particularly limited but examples thereof include polyoxyethylene alkyl ether, polyoxyethylene alkylphenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, sucrose fatty acid ester, polyoxyethylene alkylamine, polyoxyethylene fatty acid amide, alkylalkanolamide, acetylene glycol, oxyethylene adduct of acetylene glycol and polyethylene glycol polypropylene glycol block copolymer. Of these, polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylene sorbitan fatty acid ester, fatty acid alkylolamide, acetylene glycol, oxyethylene adduct of acetylene glycol and polyethylene glycol polypropylene glycol block copolymer are preferred.

Other than those, silicone-based surfactants such as polysiloxane oxyethylene adduct, fluorine-based surfactants such as perfluoroalkyl carboxylate, perfluoroalkyl sulfonate and oxyethylene perfluoroalkyl ether, and biosurfactants such as spiculisporic acid, rhamnolipid and lysolecithin may also be used.

These surfactants may be used individually or in combination of two or more thereof. The HLB of the surfactant is preferably from 7 to 20 in view of the dissolution stability.

Furthermore, the ink for ink jet recording of the present invention may contain a pH adjusting agent so as to adjust the pH of the ink. The pH adjusting agent is not particularly limited but examples thereof include acids such as hydrochloric acid, sulfuric acid, nitric acid, acetic acid, citric acid, oxalic. acid, malonic acid, boric acid, phosphoric acid, phosphorous acid and lactic acid, bases such as potassium hydroxide, sodium hydroxide, lithium hydroxide, ammonium hydroxide, triethanolamine, diethanolamine, ethanolamine, 2-amino-2-methyl-1-propanol and ammonia, and pH buffers such as phosphate, oxalate, amine salt and good buffer.

For the purpose of controlling the ink properties, the ink for ink jet recording of the present invention may contain polyethyleneimine, a polyamine, polyvinyl pyrrolidone, polyethylene glycol, a cellulose derivative such as ethyl cellulose or carboxymethyl cellulose, a polysaccharide or a derivative thereof, a water-soluble polymer, a polymer emulsion such as acryl-based polymer emulsion or polyurethane-based emulsion, cyclodextrin, a large ring amine, dendrimer, a crown ether or acetamide.

In addition, the ink for ink jet recording of the present invention may contain, if desired, an antioxidant, an antimold, a viscosity adjusting agent, an electrically conducting agent, an ultraviolet absorber, a chelating agent, a water-soluble dye, a dispersion dye, an oil-soluble dye and the like.

The ink for ink jet recording of the present invention undergoes change in the viscosity of 0.3 mPa·s or less, preferably 0.2 mPa·s or less, after the storage at 60° C. for 100 hours. If increment in the viscosity of the ink exceeds 0.3 mPa·s, this reveals that agglomeration and gelling took place between pigment particles, whereas if decrement exceeds 0.3 mPa·s, it is considered that pigment particles agglomerated and precipitated. In either case, the dispersion condition is not satisfactory and if the ink is used for ink jet recording, clogging or pressure loss is caused in the way of ejection nozzle or fine ink passage to give a problem with respect to the ejection stability. In the present invention, the change in the viscosity of the ink for ink jet recording is 0.3 mPa·s or less, accordingly, the ink is advantageously free of clogging or pressure loss in the way of ejection nozzle or fine ink passage or any trouble in the ejection stability.

For obtaining an ink of which change in the viscosity is suppressed to the above-described range, the combination of the pigment and the dispersant plays an important role and by appropriately selecting the combination while taking account of the composition of other additives, the ink can be first obtained.

The number average particle size of particles dispersed in the ink for ink jet recording of the present invention is preferably adjusted to from 15 to 100 nm, more preferably from 15 to 70 nm, still more preferably from 15 to 60 nm. If the number average particle size is less than 15 nm, the viscosity of the ink tends to increase and clogging is readily generated, whereas if it exceeds 100 nm, the storage stability of the ink is liable to decrease.

The particle size distribution mv/mn shown by the ratio of the volume average particle size mv to the number average particle size mn of particles dispersed in the ink for ink jet recording of the present invention is preferably from 1.1 to 3, more preferably from 1.1 to 2.2. If the particle size exceeds this range, the permeation rate or abrasion resistance is liable to decrease.

The particle size of particles dispersed in the ink for ink jet recording of the present invention is determined using a particle size analyzer Microtrac UPA (manufactured by Leeds & Northrup) without diluting the ink. The viscosity and the dispersed particle density as the parameters to input at the measurement are the viscosity of the ink measured and the density of the coloring material, respectively. In the case when the pigment is carbon black, the density is 1.8 g/cm$^2$.

The number of particles having a particle size of 0.5 $\mu$m or more contained in 1 L of the ink for ink jet recording of the present invention is preferably controlled to $7.5 \times 10^{10}$ particles or less, more preferably $5 \times 10^{10}$ particles or less. If the number of particles having a particle size of 0.5 $\mu$m or more exceeds $7.6 \times 10^{10}$ particles, the print reliability tends to decrease. The number of particles having a particle size of 0.5 $\mu$m or more is determined using an optical particle sizer Accsizer TM770 (manufactured by Particle Sizing Systems). This apparatus detects particles passing through the measurement part by an optical means, where 2 $\mu$L of an aqueous ink jet recording solution is poured into the measurement cell, the number of particles is counted according to a predetermined measuring method and the value obtained is calculated in terms of a value per 1 L.

Furthermore, the ink for ink jet recording of the present invention is preferably adjusted to have a surface tension of from 35 to 60 mN/m, more preferably from 40 to 50 mN/m. If the surface tension is less than 35 mN/m, blotting is readily generated in the case of printing on a plain paper and a high-resolution image cannot be obtained, whereas if it exceeds 60 mN/m, the permeation tends to proceed at a low rate and drying of the image tends to take a long time.

The viscosity of the ink for ink jet recording of the present invention is preferably adjusted to from 1.5 to 10 mPa·s, more preferably from 1.5 to 5.0 mPa·s . If the viscosity is less than 1.5 mPa·s, the ink storage stability tends to decrease, whereas if it exceeds 10 mPa·s, the ejection power tends to be reduced and the ejection can be hardly recovered on generation of clogging.

The electric conductivity of the ink for ink jet recording of the present invention is preferably adjusted to from 0.05 to 0.4 S/m, more preferably from 0.07 to 0.3 S/m. If the electric conductivity is less than 0.05 S/m, the ejection can be difficultly recovered after printing is stopped and the ink is left standing for a long period of time, whereas if it exceeds 0.4 S/m, the storage stability of the ink is readily deteriorated.

The ink for ink jet recording of the present invention preferably has a pH of from 6.0 to 11.0, more preferably from 7.5 to 9.0. If the pH is less than 6.0, clogging is readily generated, whereas if it exceeds 11.0, the head constituent part may easily corrode or dissolve. In order adjust the pH of the ink to this range, a pH adjusting agent described above is preferably used.

The process for producing the ink for ink jet recording of the present invention is described below.

The process for producing the ink of the present invention comprises previously mixing the above-described dispersant and pigment in water, dispersing the pigment in water and mixing the obtained dispersion solution with water, a water-soluble organic solvent and other materials.

In the dispersion of the pigment, various stirring or dispersing apparatuses may be used, however, a dispersing apparatus using no dispersion media such as glass, ceramic or metal balls or beads is preferred. If a dispersing apparatus using a dispersion media is used, the dispersion media or dispersion vessel is abraded at the grinding or dispersion of the pigment and a large amount of inorganic impurities are mixed into the pigment dispersion solution or ink in many cases. When a dispersing apparatus using a dispersion media is used, it is preferred, if desired, to remove inorganic impurities mixed into the dispersion solution or ink. As the dispersing apparatus using no dispersion media, an ultrasonic homogenizer and a high-pressure homogenizer are particularly preferred. In the case of using an ultrasonic homogenizer, the pigment is preferably dispersed after it is defoamed or deaerated by vacuum evacuation or heating or by means of a commercially available defoaming/deaerating apparatus.

After the dispersion, coarse particles are preferably removed by centrifugal separation. After coarse particles are, if desired, removed by filtration or the like, a water-soluble organic solvent, water and other additives are added thereto, mixed by stirring and filtered to obtain an ink. Furthermore, the ink can also be obtained by a method such that a water-soluble organic solvent, water and other additives are added to the pigment and dispersant and mixed by stirring, and the resulting mixed solution is subjected to dispersion treatment and then centrifuged or filtered to remove coarse particles.

The ink jet recording method of the present invention is described below.

The ink jet recording method of the present invention comprises ejecting the ink for ink jet recording of the present invention from an orifice according to a recording signal to effect recording on a recording material.

The ink for ink jet recording of the present invention can be used, not to speak of usual ink jet recording device, in a recording device having mounted thereon a heater or the like to assist the fixing of ink to paper or in a recording device having mounted thereon an intermediate transfer mechanism, where an ink is printed on an intermediate and then transferred to a recording material such as paper.

The ink for ink jet recording essentially comprising water, a water-soluble organic solvent, a pigment and a dispersant can be satisfied to a certain extent in the properties required for the ink for ink jet recording by using a polymer compound as the dispersant, controlling the molecular weight or acid value of the polymer compound and selecting optimal monomers for use in the copolymer. However, it has been difficult to satisfy all of the properties at the same time. In particular, it has been very difficult to simultaneously satisfy the requirements about nozzle clogging, printed image density and abrasion resistance of the printed image. The reason for this is considered as follows. In the ink jet recording, the ink composition at the tip of a nozzle varies due to evaporation of water on drying of the ink at the nozzle tip and this change in the composition is presumed to render the dispersion unstable and thereby cause precipitation, agglomeration or gelling of the pigment and in turn nozzle clogging. On the other hand, the ink ejected from a nozzle is necessary to agglomerate to a certain extent to obtain a printed image density on a print medium, however, if the ink is too much agglomerated and excessively remains on the print medium, the abrasion resistance deteriorates.

The above-described problem of related techniques can be overcome by the ink for ink jet recording of the present invention. The reason for this is presumed as follows. The unstable dispersion and agglomeration greatly depend on the molecular weight and acid value of the copolymer and as the molecular weight distribution expands, the conditions for stable dispersion and agglomeration also expand, as a result, it becomes difficult to control the dispersion stability and agglomeration. On the other hand, the dispersant for use in the present invention is optimized in the molecular weight and molecular structure and by virtue of these, the dispersion stability and agglomeration on a print medium can be controlled.

Also, an ink for ink jet recording having more excellent dispersion stability can be obtained by using a random copolymer obtained by polymerizing monomers in the presence of a polymerization initiator having a hydrophilic functional group. The reason for this is considered as follows. At least one terminal of the random polymer is hydrophilic and at the time of adsorption to the pigment surface, the molecular chain is extended into the aqueous medium and thereby the stability is more improved. In the thermal ink jet system, the dispersion state of the ink having a conventional dispersant structure becomes unstable on heating of the ink by a heater and the pigment or dispersant agglomerates and precipitates on the heater to cause so-called kogation, as a result, unstable ink jetting is liable to occur. On the other hand, the ink for ink jet recording of the present invention can maintain stable dispersion state even when heated, accordingly, kogation after continuous jetting is not caused and the printing can be stably performed.

The present invention is described in greater detail below by referring to Examples.

EXAMPLE 1

| | |
|---|---|
| Copolymer of No. 1 in Table 1 | 8.7 parts by weight |
| NaOH | 2.1 part by weight (95% neutralization to acid value) |
| Pure water | 89.2 parts by weight |

The components shown above were dissolved by heating at about 50° C. while stirring and then filtered through a 1-$\mu$m membrane filter to obtain a dispersant aqueous solution.

To 30 parts by weight of the dispersant aqueous solution obtained, 187.8 parts by weight of pure water was added and stirred and further 30 parts by weight of carbon black (Mogul L, produced by Cabot) was added while stirring. The mixed solution was stirred for 30 minutes and then treated in an ultrasonic homogenizer (output: 300 W) for 10 minutes. Thereto, 2.2 parts by weight of a 10 wt % aqueous NaOH solution was added and stirred and the resulting solution was further treated in an ultrasonic homogenizer (output: 300 W) for 20 minutes. Thereafter, 50 parts by weight of pure water was added thereto and stirred and then, the solution was centrifuged at 8,000 rpm for 30 minutes to obtain a pigment dispersion solution having a pigment concentration of 8.1 wt %.

| | |
|---|---|
| Pigment dispersion solution obtained above | 61.7 parts by weight |
| Diethylene glycol | 10 parts by weight |
| Oxyethylene adduct of diglycerin (molecular weight: about 7500) | 5 parts by weight |
| Isopropyl alcohol | 3 parts by weight |
| Urea | 6 parts by weight |
| Polyoxyethylene oleyl ether (oxyethylene: 30 mol) | 0.03 parts by weight |
| Pure water | 14.27 parts by weight |

The components shown above were mixed by stirring and then filtered through a membrane filter having a pore size of 1 $\mu$m to obtain an ink.

EXAMPLES 2 TO 5

Inks were produced in the same manner as in Example 1 except that copolymers of Nos. 2 to 5 shown in Table 1 were used in place of the copolymer of No. 1 of Example 1 in Examples 2 to 5, respectively (No. 2 in Example 2, No. 3 in Example 3, No. 4 in Example 4 and No. 5 in Example 5), the degree of neutralization to the acid value is adjusted to the same level, and the amounts of the pigment dispersion solution and pure water in the ink composition were controlled in accordance with the pigment concentration in the finish pigment dispersion solution.

COMPARATIVE EXAMPLES 1 TO 5

Inks were produced in the same manner as in Example 1 except that copolymers of Nos. 11 to 15 shown in Table 1 were used in place of the copolymer of No. 1 of Example 1 (No. 11 in Comparative Example 1, No. 12 in Comparative Example 2, No. 13 in Comparative Example 3, No. 14 in Comparative Example 4 and No. 15 in Comparative Example 5), the degree of neutralization to the acid value is adjusted to the same level, and the amounts of the pigment dispersion solution and pure water in the ink composition were controlled in accordance with the pigment concentration in the finish pigment dispersion solution.

COMPARATIVE EXAMPLE 6

An ink was produced in the same manner as in Comparative Example 1 except for using a block copolymer (weight average molecular weight Mw: 11,000, Mw/Mn: 1.5) obtained by copolymerizing 55 parts of a terminal vinylated macromonomer of a styrene (80 mol)/n-butyl methacrylate (20 mol) copolymer and 45 parts of methacrylic acid according to the synthesis method described in JP-A-6-100810.

TABLE 2

| No. | Kind of Monomer (charged, molar ratio) | Initiator | Weight Average Molecular Weight (Mw) | Mw/Mn | Value (mgKOH/g) |
|---|---|---|---|---|---|
| 11 | styrene (33)/methacrylic acid (67) | A | 2500 | 2.3 | 383 |
| 12 | styrene (33)/methacrylic acid (67) | B | 17000 | 2.1 | 395 |
| 13 | styrene (33)/methacrylic acid (67) | B | 6500 | 2.9 | 390 |

TABLE 2-continued

| No. | Kind of Monomer (charged, molar ratio) | Initiator | Weight Average Molecular Weight (Mw) | Mw/Mn | Value (mgKOH/g) |
|---|---|---|---|---|---|
| 14 | styrene (65)/methacrylic acid (35) | B | 7300 | 2.2 | 195 |
| 15 | styrene (15)/methacrylic acid (85) | A | 6800 | 2.3 | 521 |

TEST EXAMPLE 1

Using the inks obtained in Examples 1 and 5 and Comparative Examples 1 to 5, the following evaluations were performed.

(1) Surface Tension of Ink

The surface tension was measured in an environment of 23° C. and 55% RH using a Wilhelmy's surface balance.

(2) Viscosity of Ink

Rhemat 115 (manufactured by Contraves) was used as the measuring apparatus. An aqueous ink jet recording solution was placed in a measuring vessel, the vessel was fixed to the apparatus by a predetermined method, and the viscosity was measured. The measuring temperature was 23° C. and the shear rate at the measurement was 1,400 s$^{-1}$. The viscosity after storage at 60° C. for 100 hours was determined by tightly closing a glass tube containing 50 g of an ink with a cap, allowing the ink to stand in an atmosphere at 60° C. for 100 hours, spontaneously cooling the glass tube in a room at 23° C. and then measuring the viscosity in the same manner as above.

(3) Electric Conductivity of Ink

The electric conductivity was measured at 23° C. using a conductivity meter (AOL-40-3302, manufactured by DKK).

(4) pH of Ink

The pH was measured in an environment at 23° C. using a glass pH electrode.

(5) Number Average Particle Size and Volume Average Particle Size/Number Average Particle Size The particle size of dispersed particles was measured using a particle size analyzer Microtrac UPA 9340 (manufactured by Leeds & Northrup) without diluting the ink. The viscosity and the dispersed particle density as the parameters to input at the measurement were the viscosity of the ink measured and the density of the coloring material, respectively. In the case of a pigment obtained by hydrophilizing carbon black, the density was 1.8 g/cm$^2$.

(6) Number of Particles of 0.5 pm or more

The number of particles having a particle size of 0.5 µm or more was determined using an optical particle sizer Accsizer TM770 (manufactured by Particle Sizing Systems). This apparatus detects particles passing through the measurement unit by an optical means. The measurement was performed according to a predetermined measuring method by pouring 2 µL of an aqueous ink jet recording solution into the measurement cell, and the value obtained was calculated in terms of a value per 1 L.

The results of evaluations (1) to (6) are shown in Table 3.

TABLE 3

| | Ink Surface Tension (mN/m) | Ink viscosity (mPa · s) | Ink Viscosity after Storage at 60° C. for 100 Hours (mPa · s) | Ink Electric Conductivity (S/m) | pH of Ink | Number Average Particle Size (nm) | Volume Average Particle Size/Number Average Particle Size | Number of particles of 0.5 µm or more (×10$^{10}$/L) |
|---|---|---|---|---|---|---|---|---|
| Example 1 | 50 | 2.8 | 2.8 | 0.13 | 8.7 | 30 | 2.0 | 1.0 |
| Example 2 | 51 | 3.0 | 3.0 | 0.14 | 8.6 | 34 | 1.8 | 1.5 |
| Example 3 | 49 | 2.5 | 2.5 | 0.15 | 8.7 | 29 | 1.8 | 1.3 |
| Example 4 | 50 | 3.3 | 3.3 | 0.12 | 8.6 | 31 | 1.9 | 1.3 |
| Example 5 | 50 | 2.5 | 2.5 | 0.14 | 8.7 | 32 | 2.0 | 1.1 |
| Comparative Example 1 | 49 | 2.4 | 2.0 | 0.14 | 8.5 | 29 | 2.1 | 1.6 |
| Comparative Example 2 | 50 | 3.8 | 4.2 | 0.10 | 8.6 | 33 | 2.2 | 1.9 |
| Comparative Example 3 | 50 | 2.7 | 3.1 | 0.13 | 8.6 | 31 | 2.1 | 1.3 |
| Comparative Example 4 | 49 | 2.6 | 3.0 | 0.12 | 8.5 | 31 | 1.9 | 1.2 |
| Comparative Example 5 | 51 | 3.1 | 2.6 | 0.15 | 8.8 | 30 | 1.8 | 1.4 |
| Comparative Example 6 | 50 | 3.6 | 4.0 | 0.15 | 8.5 | 35 | 2.0 | 2.1 |

As apparent from Table 3, the change in viscosity of the inks obtained in Examples 1 to 5 was 0.3 mPa·s or less, whereas the change in viscosity of the inks obtained in Comparative Examples 1 to 5 was in excess of 0.3 mPa·s.

(7) Test of Dispersion Stability

A glass tube containing 50 g of an ink was tightly closed with a cap and then subjected to an acceleration test consisting of 4 cycles in total while taking the cycle of standing in an atmosphere at 70° C. for 4 hours and standing in an atmosphere at −20° C. for 4 hours as 1 cycle. Before and after the test, 5 g of the ink was sampled and filtered under pressure through a 1-µm filter using a glass holder having an effective filtration of 2.5 cm$^2$. The time necessary for the entire amount of the sample to pass through the filter was measured and evaluated according to the following criteria.

○: Increase in the time of the ink passing through the filter after the acceleration test was less than 20%.

Δ: Increase in the time of the ink passing through the filter after the acceleration test was from 20% to less than 50%.

X: Increase in the time of the ink passing through the filter after the acceleration test was 50% or more.

(8) Test of Clogging Property

After ejection was stopped in an ink jet printing machine (thermal ink jet system, 600 clpi, drop amount: about 25 ng) manufactured as a prototype, the ink in an uncapped state was left standing in an environment of 23° C. and 55% RH and then the ejection was restarted. How long the ink was left standing until image disorder occurred on restarting of the ejection was determined. The evaluation was made according to the following criteria:

⊚: 90 seconds or more

○: from 60 seconds to less than 90 seconds

Δ: from 30 seconds to less than 60 seconds

X: less than 30 seconds (9) Test of Clogging Recoverability

After confirming that normal printing can be made using the printing apparatus used in (8), the ink in an uncapped state was left standing in an environment of 23° C. and 55% RH and then a recovery operation by vacuum was repeated until normal printing could be made. The number of repetitions was recorded and evaluated according to the following criteria.

⊚: Recovered by one or less repeated operation.

○: Recovered after from 2 to 3 repeated operations

Δ: Recovered after from 4 to 5 repeated operations.

X: Recovered after 6 or more repeated operations.

(10) Test of Kogation

Using the same printer as the printing machine used in (8), $1\times10^8$ pulses were continuously jetted per 1 nozzle and the change in dot diameter on a plain paper (FX-L, produced by Fuji Xerox Co.) was examined and evaluated according to the following criteria.

⊚: Fluctuation in the dot diameter was less than 2.5% to the initial dot diameter.

○: Fluctuation in the dot diameter was from 2.5% to less than 5% to the initial dot diameter.

Δ: Fluctuation in the dot diameter was from 5% to less than 10% to the initial dot diameter.

X: Fluctuation in the dot diameter was 10% or more to the initial dot diameter.

(11) Image Density

A solid image was printed on a plain paper (FX-L, produced by Fuji Xerox Co.) using the printing machine used in (8) and the image density was determined using an optical densitometer (X-rite 404, manufactured by X-rite).

⊚: 1.3 or more

○: from 1.2 to less than 1.3

Δ: from 1.1 to less than 1.2

X: less than 1.1

(12) Test of Abrasion Resistance

One day after the printing of a solid image in the test of (11), the printed area was rubbed with a finger and sensorially evaluated.

⊚: The trace of rubbing was not or very slightly discriminated.

○: The trace of rubbing was slightly discriminated but it was within the tolerable range.

Δ: The trace of rubbing was discriminated.

X: The trace of rubbing was heavily discriminated.

(13) Test of Drying Property

In the same manner as in the test of (11), a solid image was printed on a plain paper (FX-L, produced by Fuji Xerox Co.). Then, another FX-L paper was superposed on the printed image and a load of 100 g/cm² was imposed thereon. The time spent until the ink was not transferred onto the coated paper superposed was measured and evaluated according to the following criteria.

○: less than 10 seconds

Δ: from 10 seconds to less than 20 seconds

X: 20 seconds or more

The results of evaluations (7) to (13) are shown in Table 4 below.

TABLE 4

|  | (7) Test of Dispersion Stability | (8) Test of Clogging Property | (9) Test of Clogging Recoverability | (10) Test of Kogation | (11) Image Density | (12) Test of Abrasion Resistance | (13) Test of Drying Property |
|---|---|---|---|---|---|---|---|
| Example 1 | ○ | ⊚ | ⊚ | ⊚ | ⊚ | ○ | ○ |
| Example 2 | ○ | ⊚ | ○ | ⊚ | ○ | ○ | ○ |
| Example 3 | ○ | ○ | ⊚ | ⊚ | ⊚ | ⊚ | ○ |
| Example 4 | ○ | ○ | ○ | ⊚ | ⊚ | ⊚ | ○ |
| Example 5 | ○ | ⊚ | ○ | ○ | ⊚ | ⊚ | ○ |
| Comparative Example 1 | Δ | ○ | X | Δ | ⊚ | ○ | Δ |
| Comparative Example 2 | ○ | Δ | X | ○ | ⊚ | ○ | Δ |
| Comparative Example 3 | X | Δ | Δ | X | ⊚ | X | ○ |
| Comparative Example 4 | Δ | X | X | X | ⊚ | Δ | Δ |
| Comparative Example 5 | ○ | Δ | X | Δ | Δ | ○ | Δ |
| Comparative Example 6 | Δ | Δ | X | X | ○ | Δ | Δ |

EXAMPLE 6

To 19.5 parts by weight of the dispersant aqueous solution obtained in Example 1, 199.7 parts by weight of pure water was added and stirred, and thereto 30 parts by weight of carbon black (Raven 1080, produced by Colombian Carbon) was added while stirring. The mixed solution was stirred for 30 minutes and subsequently treated in an ultrasonic homogenizer (output: 300 W) for 10 minutes. Thereto, 0.8 parts by weight of a 10 wt % aqueous NaOH solution was added and stirred and further the resulting solution was treated in an ultrasonic homogenizer (output: 300 W) for 20 minutes. Thereafter, 50 parts by weight of pure water was added thereto and the resulting solution was stirred and then centrifuged at 7,000 rpm for 30 minutes to obtain a pigment dispersion solution having a pigment concentration of 7.8 wt %.

| | |
|---|---|
| Pigment dispersion solution obtained above | 51.3 parts by weight |
| Diethylene glycol | 5 parts by weight |
| Thiodiethanol | 10 parts by weight |
| Isopropyl alcohol | 3 parts by weight |
| Urea | 6 parts by weight |
| Polyoxyethylene oleyl ether (oxyethylene: 30 mol) | 0.03 parts by weight |
| Pure water | 24.67 parts by weight |

The components shown above were mixed by stirring and then filtered through a membrane filter having a pore size of 1 μm to obtain an ink.

EXAMPLES 7 TO 11

Dispersant Aqueous Solution Nos. 1 to 5 were obtained using copolymers of Nos. 6 to 10 shown in Table 1 in Examples 7 to 11, respectively (No. 6 in Example 7, No. 7 in Example 8, No. 8 in Example 9, No. 9 in Example 10 and No. 10 in Example 11). Each aqueous solution was prepared by dissolving the components shown in Table 5 below while stirring under heating at about 50° C. and filtering the resulting solution through a 1-μm membrane filter.

TABLE 5

(units in the Table all are parts by weight)

| No. of Dispersant Aqueous Solution | No. 1 | No. 2 | No. 3 | No. 4 | No. 5 |
|---|---|---|---|---|---|
| Copolymer of No. 6 | 8.7 | | | | |
| Copolymer of No. 7 | | 8.7 | | | |
| Copolymer of No. 8 | | | 8.7 | | |
| Copolymer of No. 9 | | | | 8.7 | |
| Copolymer of No. 10 | | | | | 8.7 |
| NaOH | | | | 1.67 | |
| KOH | 2.35 | | | | 3.24 |
| LiOH | | 1.23 | 0.81 | | |
| Pure Water | 88.95 | 90.07 | 90.49 | 89.63 | 88.06 |
| (Degree of Neutralization) | (60%) | (80%) | (90%) | (100%) | (93%) |

Using these Dispersant Aqueous Solution Nos. 1 to 5, inks of Examples 7 to 11 were obtained in the same manner as in Example 6.

TEST EXAMPLE 2

The inks obtained in Examples 6 to 11 were subjected to evaluations (1) to (13) in Test Example 1. The results of evaluations (1) to (6) are shown in Table 6 and the results of evaluations (7) to (13) are shown in Table 7.

TABLE 6

| | Ink Surface Tension (mN/m) | Ink viscosity (mPa · s) | Ink Viscosity after Storage at 60° C. for 100 Hours (mPa · s) | Ink Electric Conductivity (S/m) | pH of Ink | Number Average Particle Size (nm) | Volume Average Particle Size/Number Average particle Size | Number of particles of 0.5 μm or more (×10$^{10}$/L) |
|---|---|---|---|---|---|---|---|---|
| Example 6 | 50 | 2.2 | 2.1 | 0.09 | 8.7 | 52 | 1.9 | 4.9 |
| Example 7 | 50 | 2.1 | 2.0 | 0.09 | 8.7 | 51 | 1.9 | 4.8 |
| Example 8 | 51 | 2.2 | 2.2 | 0.16 | 8.6 | 55 | 1.8 | 4.5 |
| Example 9 | 48 | 2.5 | 2.6 | 0.10 | 8.7 | 45 | 1.8 | 4.0 |
| Example 10 | 50 | 2.6 | 2.8 | 0.12 | 8.6 | 48 | 2.0 | 5.0 |
| Example 11 | 49 | 2.0 | 2.1 | 0.11 | 8.5 | 50 | 2.0 | 4.3 |

As apparent from the results in Table 6, the change in viscosity of the inks obtained in Examples 6 to 11 was 0.3 mPa·s or less.

TABLE 7

| | (7) Test of Dispersion Stability | (8) Test of Clogging Property | (9) Test of Clogging Recoverability | (10) Test of Kogation | (11) Image Density | (12) Test of Abrasion Resistance | (13) Test of Drying Property |
|---|---|---|---|---|---|---|---|
| Example 6 | ○ | ⊚ | ⊚ | ⊚ | ⊚ | ⊚ | ○ |
| Example 7 | ○ | ⊚ | ○ | ⊚ | ○ | ○ | ○ |
| Example 8 | ○ | ○ | ⊚ | ○ | ○ | ⊚ | ○ |
| Example 9 | ○ | ○ | ○ | ⊚ | ⊚ | ⊚ | ○ |
| Example 10 | ○ | ⊚ | ○ | ○ | ○ | ⊚ | ○ |
| Example 11 | ○ | ○ | ⊚ | ⊚ | ⊚ | ○ | ○ |

According to the present invention, an ink for ink jet recording having good dispersion stability, free of generation of nozzle clogging even after the ink is left standing for a long period of time, exhibiting very good fixing property on various papers, and prevented from occurrence of kogation even when it is applied to thermal ink jet system, can be obtained.

What is claimed is:
1. An ink for ink jet recording comprising water, a water-soluble organic solvent, a pigment and a dispersant, wherein the dispersant has a hydrophilic moiety and a hydrophobic moiety and comprises a copolymer obtained by copolymerizing from 40 to 80 mol % of a monomer having an α, β-ethylenically unsaturated group constituting the hydrophilic moiety and from 20 to 60 mol % of a styrene monomer constituting the hydrophobic moiety, the copolymer has a weight average molecular weight Mw of from 3,000 to 15,000 and assuming that the number average molecular weight is Mn, the Mw/Mn is from 1 to 2.5, wherein the change in viscosity of the ink after storage at 60° C. for 100 hours is 0.3 mPa·s or less at a shear rate of 1,400 $s^{-1}$.

2. The ink for ink jet recording as claimed in claim 1, wherein the pigment is carbon black.

3. The ink for ink jet recording as claimed in claim 2, wherein the carbon black has a primary particle size of from 10 to 30 nm, a BET specific surface area of from 80 to 200 $m^2$/g, a volatile matter of from 1 to 6% and a DBP oil absorption of from 50 to 80 ml/100 g.

4. An ink for ink jet recording comprising water, a water-soluble organic solvent, a pigment and a dispersant, wherein the dispersant has a hydrophilic moiety and a hydrophobic moiety and comprises a copolymer obtained by copolymerizing from 40 to 80 mol % of a monomer having an α, β-ethylenically unsaturated group constituting the hydrophilic moiety and from 20 to 60 mol % of a styrene monomer constituting the hydrophobic moiety, the copolymer has a weight average molecular weight Mw of from 3,000 to 15,000 and assuming that the number average molecular weight is Mn, the Mw/Mn is from 1 to 2.5.

5. The ink for ink jet recording as claimed in claim 4, wherein the monomer having an α,β-ethylenically unsaturated group constituting the hydrophilic moiety is at least one selected from the group consisting of acrylic acid, methacrylic acid, maleic acid and maleic acid anhydride.

6. The ink for ink for ink jet recording as claimed in claim 4, wherein the dispersant is neutralized in a degree of 50% or more to the acid value of the copolymer.

7. The ink for ink jet recording as claimed in claim 6, wherein the dispersant is neutralized by a basic substance containing a hydroxide of alkali metal.

8. The ink for ink jet recording as claimed in claim 4, wherein the copolymer is a random copolymer.

9. The ink for ink jet recording as claimed in claim 8, wherein the copolymer is random copolymerized in the presence of a polymerization initiator having a hydrophilic functional group.

10. The ink for ink jet recording as claimed in claim 9, wherein the hydrophilic functional group is a carboxyl group, a salt thereof or a mixture thereof.

* * * * *

UNITED STATES PATENT AND TRADEMARK OFFICE
CERTIFICATE OF CORRECTION

PATENT NO. : 6,245,832 B1
DATED : June 12, 2001
INVENTOR(S) : Atsushi Suzuki et al.

It is certified that error appears in the above-identified patent and that said Letters Patent is hereby corrected as shown below:

Column 19,
Line 1, before "hydrophilic" insert -- single --.

Column 19,
Line 22, before "hydrophilic" insert -- single --.

Column 20,
Line 10, before "jet recording", delete "for ink" (second occurrence).

Signed and Sealed this

Twenty-third Day of April, 2002

Attest:

Attesting Officer

JAMES E. ROGAN
*Director of the United States Patent and Trademark Office*